United States Patent
Ball et al.

(10) Patent No.: US 6,529,863 B1
(45) Date of Patent: Mar. 4, 2003

(54) METHOD AND APPARATUS FOR PROVIDING INTERACTIVE SERVICES WITH MULTIPLE INTERFACES

(75) Inventors: Thomas J. Ball, Mercer Island, WA (US); Peter John Danielsen, Naperville, IL (US); Lalita Jategaonkar Jagadeesan, Naperville, IL (US); Konstantin Laufer, Chicago, IL (US); Peter Andrew Mataga, Naperville, IL (US); Kenneth G. Rehor, Berwyn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/386,094

(22) Filed: Aug. 30, 1999

(51) Int. Cl.⁷ .................. G06F 17/20; G06F 17/27; G10L 19/00; H04M 1/66
(52) U.S. Cl. .............. 704/1; 704/9; 704/270; 379/88
(58) Field of Search .............. 704/1, 9, 270, 704/275; 379/67, 88

(56) References Cited

U.S. PATENT DOCUMENTS

| | | | |
|---|---|---|---|
| 4,688,195 A | * 8/1987 | Thompson et al. | 704/9 |
| 5,600,765 A | * 2/1997 | Ando et al. | 395/133 |
| 5,677,993 A | * 10/1997 | Ohga et al. | 704/275 |
| 5,748,974 A | * 5/1998 | Johnson | 704/9 |
| 5,799,063 A | 8/1998 | Krane | |
| 5,805,775 A | * 9/1998 | Eberman et al. | 395/12 |
| 5,884,249 A | * 3/1999 | Namba et al. | 704/9 |
| 5,884,262 A | 3/1999 | Wise et al. | |

* cited by examiner

Primary Examiner—Patrick N. Edouard
(74) Attorney, Agent, or Firm—Thomas Stafford

(57) ABSTRACT

Interactive services are provided by employing a modular approach to implementing interactive services with multiple interfaces. Such an approach facilitates supporting natural language understanding interaction with users through use of interfaces that allow at least different ordering of inputs, and/or incomplete information, and/or correction of information, and/or the return of control to prior points in the service. This is realized, in an embodiment of the invention, by employing a single interactive service logic that uses "reactive constraint graphs", i.e., a form of event-driven graph, in which nodes contain a set of constraints on events. Specifically, control progresses from a node to a derivative node, i.e., "child", only when all the constraints in the set on the node have been satisfied. A single set of constraints implicitly supports a significant number of the possible different orderings of inputs. Incomplete information is supported because the constraints in the set are evaluated as soon as possible. Correction of information is supported because information in the constraint set is updated upon receipt of new information. Indeed, use of the reactive constraint graphs allows nodes to be labeled, and allows control to revert to a prior node, i.e., ancestor, hence allowing the user to go back to prior points in the service. New inputs can be added to the constraint sets with a complexity polynomial of the order of the input set.

73 Claims, 15 Drawing Sheets

FIG. 6

```
prompt(req_events, opt_events, choice_events, uplabels) {
  ...
  if (req_events.contains_any_of("startDeposit", "startWithdrawal",
                    "startTransfer","startBalance") {
     return("What transaction would you like to do?");
  };
  ....
  if (req_events.contains("startTransfer"))
     transaction_type.set("Transfer");
  ...
  if (transaction_type.equals("Transfer")) {
     if (req_events.contains({"src", "tgt", "amount"})) {
        return("Please specify the source account, target account,
            and the amount you would like to transfer.")
     }
  .....
  };
} help(req_events, opt_events, choice_events, uplabels) {
  ....
  if (req_events.contains_any_of("startDeposit", "startWithdrawal",
                    "startTransfer","startBalance") {
     return("You may make a deposit, withdrawal or transfer. Or you may quit the service");
  }
}
```

FIG. 9

```
<request> = ([I (want to | would like to)] | I'd like to )| please;

<transfer_request> = [<request>] (make a transfer | transfer [money]) {startTransfer};

public <transfer> = <transfer_request> [<src_tgt_amount> | <src_tgt> | <src_amount> |
                    <tgt_amount> | <src> | <tgt> | <amount>];

public <src_tgt-amount> = [<transfer_request>]
            (<sum> from [my] <account_type> {src} [account]
            (to | into) [my] <account_type> {tgt} [account] |
            <sum> (to | into) [my] <account_type> {tgt} [account]
            from [my] <account_type> {src} [account] ) |
            from [my] <account_type> {src} [account],
            [<transfer_request>] (<sum>)
            (to | into) [my] <account_type> {tgt} [account];

public <src_amount> = [<transfer_request>] (<sum> from [my] <account_type> {src}
[account]) |
            from [my] <account_type> {src} [account], [<transfer_request>] (<sum>);
....
<uprequest> = [<request>] [go] [back [up]) | up] [to] [the];

public <upMainMenu> = [<uprequest>]Main Menu {upMainMenu};
```

FIG. 10

```
enableRules(req_events, opt_events, choice_events, uplabels) { evts = req_events + opt_events + choice_events + uplabels;

if (evts.contains({"src", "tgt", "amount"})) {
        grammar.enable("<src_tgt_amount>");
    }
    if (evts.contains({"src","amount"})) {
        grammar.enable("<src_amount>");
    }
    ....
    if (uplabels.contains("upMainMenu")) {
        grammar.enable("<upMainMenu>");
    }
}
```

FIG. 12A

```
c0 = Constraint(signature: {src},
        eval: ActiveAccount(?src,login_name),
        violation: notify("Sorry, this account is not active. Please log into
the service again.");
        ancestor_uplabel: LoginMenu;);

c1 = Constraint(signature: {src},
        eval: AccountValid(?src),
        violation: notify("Sorry, " + ?src + " is not a valid account."));

c2 = Constraint(signature: {tgt},
        eval: AccountValid(?tgt),
        violation: notify("Sorry, " + ?tgt + " is not a valid amount."));

c3 = Constraint(signature: {amt},
        eval: ?amt > 0,
        violation: notify("Sorry, " + ?amt + " is not a positive amount."));

c4 = Constraint(signature: {src,amt},
        eval: ?amt <= Balance(?src),
        satisfaction: notify("Your " ?src + " account has sufficient funds to cover
                the amount of " + ?amt + " dollars.",
        violation: notify("Sorry, your " ?src + " account does not have sufficient funds to cover
                the amount of " + ?amt + " dollars,"));

c5 = Constraint(signature: {src,tgt},
        eval: TransferPermitted(src,tgt),
        violation: notify("Sorry, transfers are not allowed between " + ?src
+" account
                and " + ?tgt + "account."));
```

Transfer = ConstraintNode(constraints: {c0, c1, c2, c3, c4, c5};
        exit_action: makeTransfer(?src, ?amt, ?tgt);
        notify("We have transferred " + ?amt + " dollars from your " + ?src + " account
        to your " + ?tgt + " account"));

Withdrawal = ConstraintNode(...); Deposit = ConstraintNode(...);

Quit = ActionNode(action: hasQuit=true; notify("Goodbye.");)

MainMenu = ChoiceNode(children: {(startTransfer, Transfer), (startWithdrawal, Withdrawal),
        (startDeposit, Deposit), (userQuit, Quit)},
        loop_condition: !hasQuit,
        uplabel: upMainMenu);
login_pin = Constraint(signature: {login, pin},
        eval: login==pin,
        satisfaction: action(login_name=?login);
        violation: notify("Sorry, your login and pin combination is not valid.");)

good_customer = Constraint(signature: {login},
        eval: goodCustomer(login),
        violation: notify("Sorry, you cannot access your accounts using this service.");
        child: Quit);

Login = ConstraintNode(constraints: {good_customer, login_pin},
        notify("Welcome " + getName(?login)),
        child: MainMenu,
        uplabel: LoginMenu);

StartService = ActionNode(action: hasQuit=false;
        notify("Welcome to the Sisl AnyTime Teller");
        child: Login),

FIG. 13A

THE BEHAVIOR OF A CONSTRAINT NODE IS AS FOLLOWS:

1. THE NODE FIRST EXECUTES ITS (OPTIONAL) ENTRY ACTION. IT THEN CREATES A TABLE IN WHICH EVERY EVENT IN THE SIGNATURE OF A CONSTRAINT ASSOCIATED WITH THE NODE HAS A SLOT. EACH SUCH EVENT HAS A SINGLE SLOT IN THE TABLE, EVEN IF IT OCCURS IN MULTIPLE CONSTRAINTS. EACH SLOT IN THE TABLE CONTAINS THREE FIELDS: THE NAME OF THE EVENT, THE DATA ASSOCIATED WITH THE EVENT WHEN IT ARRIVES, AND A BOOLEAN VARIABLE THAT INDICATES WHETHER THE EVENT ARRIVED FROM THE ENVIRONMENT AND DID NOT CAUSE A CONSTRAINT VIOLATION. THE DATA FIELD OF EVERY SLOT IS INITIALLY EMPTY AND THE BOOLEAN VARIABLE IN EVERY SLOT IS INITIALLY FALSE.

2. THE NODE SENDS A prompt_req EVENT TO THE USER INTERFACES (VIA THE SERVICE MONITOR) -- FOR EVERY EVENT "e" WHOSE BOOLEAN VARIABLE IS SET TO FALSE IN THE TABLE.

3. THE NODE SENDS A prompt_opt EVENT TO THE USER INTERFACES (VIA THE SERVICE MONITOR) -- FOR EVERY EVENT "e" WHOSE BOOLEAN VARIABLE IS SET TO TRUE IN THE TABLE.

4. THE NODE THEN WAITS FOR ANY EVENT THAT IS IN THE SIGNATURE OF ANY CONSTRAINT ASSOCIATED WITH THE NODE, i.e., HAS A SLOT IN THE TABLE OR IS THE UPLABEL OF ANY ANCESTOR NODE.

5. UPON ARRIVAL OF ANY SUCH EVENT "e", IF "e" IS THE UPLABEL OF SOME ANCESTOR NODE, CONTROL IS TRANSFERRED TO THAT ANCESTOR.
OTHERWISE:

(a) THE BOOLEAN VARIABLE IN THE SLOT FOR "e" IS SET TO TRUE. THE DATA ASSOCIATED WITH THE EVENT "e" IS WRITTEN IN THE TABLE; IF PREVIOUS DATA IS PRESENT, IT IS FIRST ERASED.

(b) THE enabled CONSTRAINTS "c" ARE THOSE THAT SATISFY THE FOLLOWING CONDITIONS:
   - THE EVENT "e" OCCURS IN THE SIGNATURE OF THE CONSTRAINT "c".
   - ALL EVENTS IN THE SIGNATURE OF THE CONSTRAINT "c" HAVE THEIR BOOLEAN VARIABLES SET TO TRUE IN THE TABLE.

(c) THE ENABLED CONSTRAINTS "c" ARE EVALUATED IN THE SPECIFIED PRIORITY ORDER:
- IF THE FIRST/NEXT CONSTRAINT c IN PRIORITY ORDER IS VIOLATED.
    - ITS (OPTIONAL) VIOLATION ACTION AND NOTIFY FUNCTION ARE EXECUTED, AND THE RETURNED notify EVENT IS SENT TO THE USER INTERFACES VIA THE SERVICE MONITOR.
    - THE BOOLEAN VARIABLE IN THE SLOT FOR "e" IS RESET TO FALSE, AND THE DATA FIELD IS REINITIALIZED TO BE EMPTY.
    - THE UPLABEL FUNCTION OF CONSTRAINT "c" IS EXECUTED (IF IT IS SPECIFIED). IF IT RETURNS THE UPLABEL OF AN ANCESTOR NODE,
        * THE UPLABEL IS GENERATED AND CONTROL IS TRANSFERRED TO THE ANCESTOR NODE.
    - ELSE IF THE CONSTRAINT HAS A SPECIFIED CHILD NODE.
        * CONTROL IS TRANSFERRED TO THE SPECIFIED NODE.
    - ELSE THE CONSTRAINT NODE GOES BACK TO WAITING FOR EVENTS, (STEP 2).
- ELSE THE NEXT ENABLED CONSTRAINT IS EVALUATED. IF NONE REMAIN TO BE EVALUATED, THE CONSTRAINT NODE GOES TO STEP 5 (d).

(d) IF ALL ENABLED CONSTRAINTS WERE SATISFIED,
- THE (OPTIONAL) SATISFACTION ACTION AND NOTIFY FUNCTION OF EACH SATISFIED CONSTRAINT ARE EXECUTED, AND THE RETURNED notify EVENTS ARE SENT TO THE USER INTERFACE VIA THE SERVICE MONITOR.
- IF ALL CONSTRAINTS ASSOCIATED WITH THE NODE WERE ENABLED AND SATIFIED.
    - THE (OPTIONAL) EXIT ACTION AND NOTIFY FUNCTION ARE EXECUTED AND THE RETURNED notify EVENT IS SENT TO THE USER INTERFACES VIA THE SERVICE MONITOR.
    - THE UPLABEL FUNCTION OF THE CONSTRAINT NODE IS EXECUTED (IF IT IS SPECIFIED). IF IT RETURNS THE UPLABEL OF AN ANCESTOR NODE,
        * THE UPLABEL IS GENERATED AND CONTROL IS TRANSFERRED TO THE ANCESTOR NODE.
    - ELSE IF THE CONSTRAINT NODE HAS A SPECIFIED CHILD NODE,
        * CONTROL IS TRANSFERRED TO THE SPECIFIED NODE.
- ELSE THE CONSTRAINT NODE GOES BACK TO WAITING FOR EVENTS, (STEP 2).

METHOD AND APPARATUS FOR PROVIDING INTERACTIVE SERVICES WITH MULTIPLE INTERFACES

RELATED APPLICATIONS

U.S. patent application Ser. No. 09/386,093 (T. J. Ball et al.) was filed concurrently herewith.

TECHNICAL FIELD

This invention relates to providing interactive services and, more particularly, to interactive services with multiple interfaces.

BACKGROUND OF THE INVENTION

Prior arrangements for implementing interactive services with multiple interfaces employed finite-state machines (FSM) to realize the necessary service logic 201. This was achieved either explicitly, using FSM tools such as ObjecTime or StateCharts, or implicitly, using programming languages/technologies such as C, C++, Perl or Microsoft Active Server Pages (ASP).

In order to support natural language understanding interaction with users, services with flexible interfaces need to allow different ordering of inputs, incomplete information, correction of information and the return of control to previous points in the service. Finite-state machine based approaches, however, cannot support these desired aspects in a modular fashion. Indeed, every possible ordering of inputs needs to be explicitly specified, resulting in an exponentially increasing number of states and transitions in the FSM. Additionally, including the other desirable aspects noted above further increases the size and complexity of the FSM. Moreover, it is extremely difficult to modify the FSM; for example, the number of modifications required to the FSM to add another input can be exponential in the size of the input set.

Prior arrangements employed to provide spoken dialog interaction are focused on a single, spoken language interface, which is limiting.

SUMMARY OF THE INVENTION

Problems and limitations of prior known arrangements for providing interactive services are overcome by employing a modular approach to implementing interactive services by employing a single service logic and a plurality, i.e., multiplicity, of user interfaces including at least one user interface having natural language understanding. The use of a single service logic having a natural language understanding facilitates supporting natural language understanding interaction with users through use of interfaces and also allows at least the different ordering of inputs from user interfaces, and/or incomplete information from user interfaces, and/or correction of information from user interfaces, and/or the return of control to prior points in the service in response to a request via a user interface.

This is realized, in an embodiment of the invention, by employing a single interactive service logic that can interface to a plurality of user interfaces including at least one user interface having natural language understanding capability. The single interactive service logic advantageously employs "reactive constraint graphs", i.e., a form of event-driven graph, in which nodes contain a set of constraints on events. The reactive constraint graphs are used as a way of providing flexibility in allowing the different ordering of inputs from user interfaces, and/or incomplete information from user interfaces, and/or correction of information from user interfaces, and/or the return of control to prior points in the service in response to a request from a user interface. Specifically, control progresses from a node to a derivative node, i.e., "child", only when all the constraints in the set on the node have been satisfied. A single set of constraints implicitly supports a significant number of the possible different orderings of inputs. Incomplete information is supported because the constraints in the set are evaluated as soon as possible. Correction of information is supported because information in the constraint set is updated upon receipt of new information. Indeed, use of the reactive constraint graphs allows nodes to be labeled, and allows control to revert to a prior node, i.e., ancestor, hence allowing the user to go back to prior points in the service. New inputs can be added to the constraint sets with a complexity polynomial of the order of the input set.

This inventive approach allows the addition or deletion of inputs and/or constraints in a modular fashion. In turn, this greatly simplifies the design and implementation of interactive services with flexible interfaces, including those based on a natural language understanding.

BRIEF DESCRIPTION OF THE DRAWING

FIG. 6 illustrates in pseudo code form a portion of an automatic speech recognition (ASR) interface and a Web user interface employed in the Any-Time Teller example;

FIG. 9 shows in pseudo code form a portion of the ASR interface grammar used in the Any-Time Teller example;

FIG. 10 shows in pseudo code form a portion of an ASR User interface employed in the Any-Time Teller example;

FIG. 12A and FIG. 12B, when connected X—X, illustrate in pseudo code form the steps of a portion of the SISL service unit process used in the Any-Time Teller banking service example; and FIG. 13A and FIG. 13B, when connected Y—Y, illustrate the steps performed in the execution of constraint nodes.

DETAILED DESCRIPTION

Figure 1:
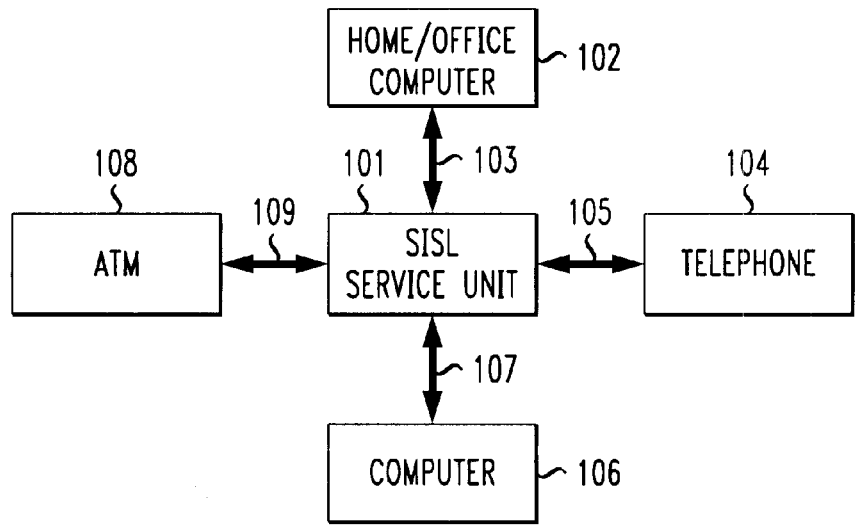
FIG. 1 shows, in simplified block diagram form, details of an interactive system in which the invention may be advantageously employed.

FIG. 1 shows, in simplified block diagram form, details of an interactive system in which the invention may be advantageously employed. It should be noted that the arrangement shown in FIG. 1 is but one example of an application of the invention. Indeed, a plurality of different user interfaces and/or one more identical user interfaces may be employed as desired.

Specifically, shown in FIG. 1 is SISL (Several Interfaces, Single Logic) service unit 101; home/office computer 102 used as a customer and/or provider interface, including automatic speech recognition having a natural language understanding, if desired, that is interfaced to SISL service unit 101 via an Internet link 103; telephone 104 also used as a customer and/or provider interface that is interfaced to SISL service unit 101 via a telephone network 105 including, for example, touch-tone, i.e., multi-frequency signaling; computer 106 used as a customer and/or provider interface, which may also have automatic speech recognition including natural language understanding, that is interfaced to SISL service unit 101 via a local area network (LAN); and ATM (automatic teller machine) used as a customer interface and, typically, is interfaced to SISL service unit 101 via a direct connect 109. A key advantage of SISL is that all user interfaces to a service share the same single service logic. SISL provides a clean separation between the service logic and the software for a variety of user interfaces including but not limited to Java applets, HTML pages, speech-based natural language dialog, and telephone-based voice access. In this example, SISL is implemented using the JAVA programming language.

At the outset it is felt best to describe some of the principles employed in implementing the flexible interactive service including an embodiment of the invention. For simplicity and clarity of exposition, these principles will be presented in the context of a so-called Any-Time Teller banking service employing the invention. The Any-Time Teller is an interactive banking service. The service is login protected; customers must authenticate themselves by entering an identifier (login) and PIN, i.e., personal identification number, (password) to access the functions. As customers may have many money accounts, most functions require the customer to select the account(s) involved. Once authenticated, the customer may:

Make a deposit.

Make a withdrawal. The service makes sure the customer has enough money in the account, then withdraws the specified amount.

Transfer funds between accounts. The service prompts the customer to select a source and target account, and a transfer amount, and performs the transfer if(1) the customer has enough money in the source account, and (2) transfers are permitted between the two accounts.

Get the balance of an account. Display the balance with respect to all posted transactions.

View the transactions of an account. Display the transactions for the selected account.

See the last transaction. Display the last action the customer performed.

The transfer capability of the Any-Time Teller requires the collection of three events: the source account (src), target account (tgt), and dollar amount (amt). There are five constraints that those input events must meet before a transfer can take place:

c1: src must be a valid account c2: tgt must be a valid account c3: amt must be greater than zero c4: amt must be less than or equal to the balance of src c5: the bank must allow transfers from src to tgt The service should check whether or not a constraint is violated as soon as possible; hence, it must be prepared to react when only a subset of the three events is present. The service must then prompt for the remaining events.

Some basic principles are now considered related to the design and implementation of interactive services with multiple and varied user interfaces. These principles are especially important in the presence of multiple interfaces including those based on spoken natural language.

Lesser order=greater freedom

The source account, target account, and dollar amount of the transfer capability should be independent events that can be collected in any order, where all three events are necessary to perform a transfer. By making explicit independent and dependent events, it in clear what events may be reordered without affecting the behavior of the service. This points the way to our first principle of the service specification:

Principle 1: Specify the service logic as a set of constraints on events and introduce a constraint between two events only when absolutely necessary for the correct functioning of a service. That is, the service logic should be able to accept independent input events in different orders.

Eliminate errors only

It is often desirable for a service to respond as soon as possible with error conditions about user input. Since a constraint on the input events may refer to any arbitrary subset of those events, it is desirable that the service logic should be able to accept arbitrary subsets of events at any time.

Principle 2: The service logic should accept an incomplete input, i.e., subsets of the universe of possible events.

I take that back!

Unfortunately, humans often change their mind and/or make mistakes. Whenever possible, services must accommodate these shortcomings of our species, providing a capability to correct information or back out of a transaction. This leads to our third principle:

Principle 3: The service logic should allow the user to back up to correct or update previously submitted information at any time.

A closely related principle is:

Principle 4: The service logic should allow the user to back up to previous points in the service.

Ready or not?

Services that obey the above principles generalize from linear user interactions to potentially allow multiple points of interaction to be enabled at a given instant. This information serves as an abstraction of the current control point of the service, and can be handled in a different manner by different user interfaces. For example, in automatic speech recognition interfaces, the information about currently enabled events is used by the user interface in two ways:

to appropriately prompt the user for information, thus compensating for the lack of visual cues; and to effectively parse the information provided by the user.

A user interface need not respond to all currently enabled events of the service. Thus, different user interfaces can formulate different queries to the user even though the control point in the underlying service logic, as revealed by the current set of enabled events, is the same. The decoupling that we are seeking between the user interface and the service logic, therefore points the way to our last principle of the service specification:

Principle 5: At any point in the service, the service logic must automatically report to the user interfaces all currently enabled events, user prompts, help, and ways to revert back to previous points in the service.

User interfaces have two main responsibilities with respect to the SISL architecture that reflect the two-way information flow between the user interface and service logic:

Based on the events received from the service logic, via the service monitor, prompt the user to provide the appropriate information and respond if the user requests help.

Collect the information from the user and transform the information into events to be sent to the service logic, via the service monitor.

Indeed, any user interface (UI) that performs these functions can be employed in conjunction with a SISL service logic. Additionally, SISL provides a convenient framework for designing and implementing web-based, applet-based, automatic speech recognition-based and telephone voice-based interfaces. To implement such user interfaces, the UI designer need only specify two functions corresponding to the prompt and help mechanism. For automatic speech recognition interfaces, a set of speech grammars, i.e., the input to a speech recognition engine that permits it to efficiently and effectively recognize spoken input, together with a third function that specifies which grammars to enable is also required.

Figure 7:
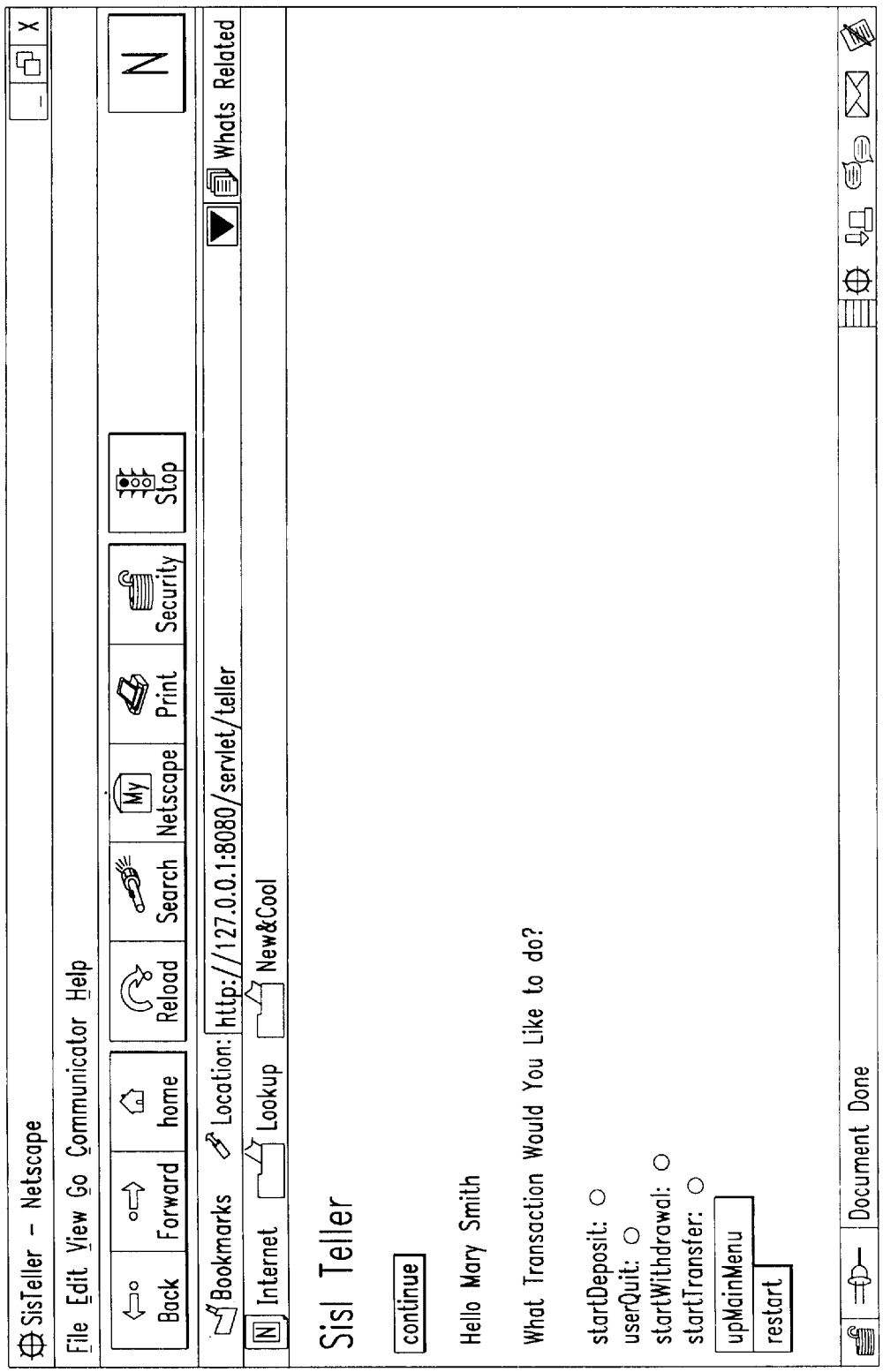
FIG. 7 is a pictorial representation of a Web page used in the Web interface for a Choice Node.
Figure 8:
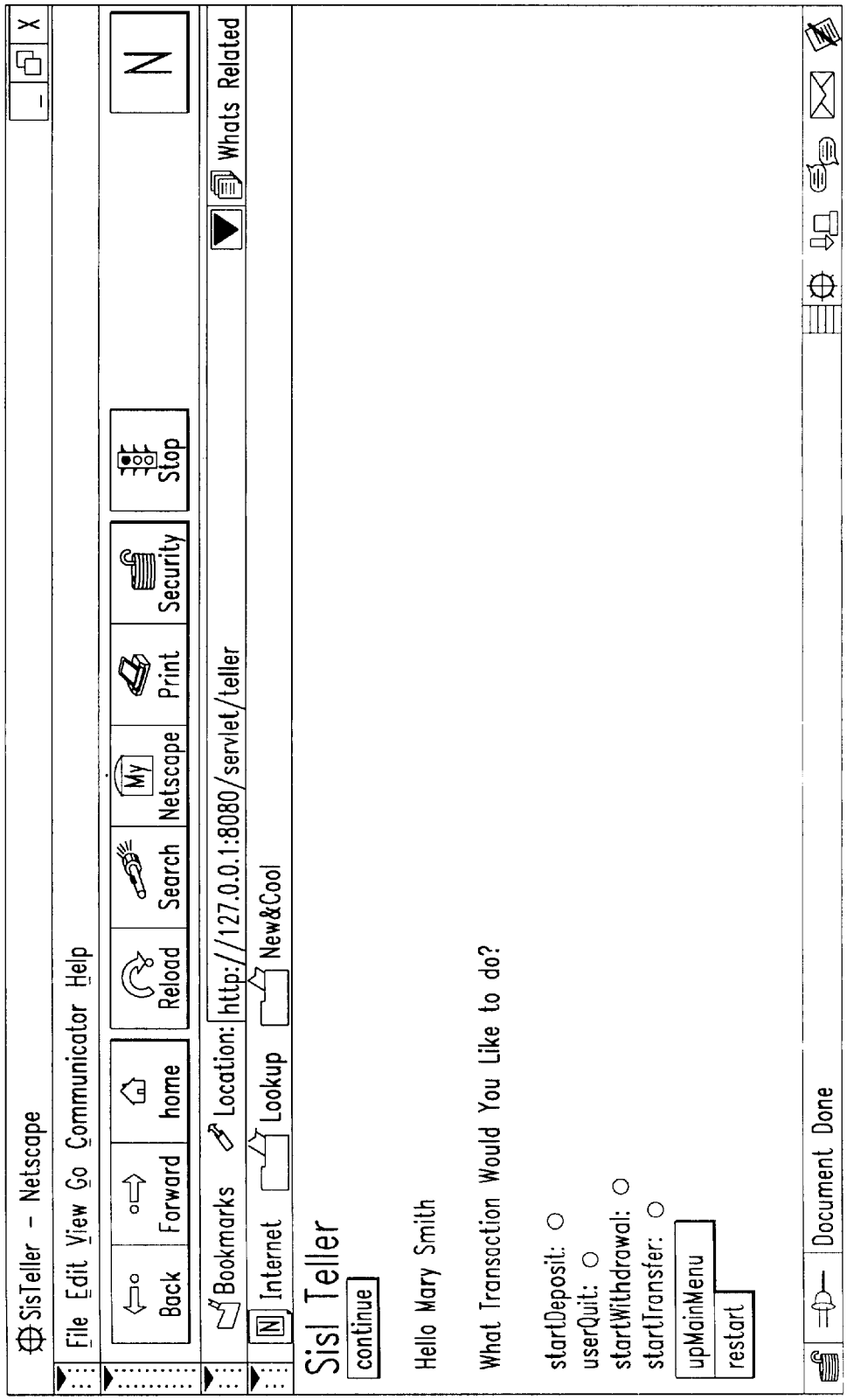
FIG. 8 is a pictorial representation of a Web page used in the Web interface for a Constraint Node.

The required functions are:

A prompt function that generates the string to be given as the prompt to the user. An example, in pseudo code form is shown in FIG. 6. The SISL infrastructure automatically causes automatic speech recognition-based interfaces to speak the prompt string. Web-based interfaces automatically display the prompt string, as well as, radio buttons corresponding to the possible transaction choices. For the other prompt events, text fields are automatically displayed, while submit buttons are automatically displayed for enabled events that allow the user to return to earlier points in the service. Screen snapshots are shown in FIGS. 7 and 8. Specifically, FIG. 7 is a pictorial representation of a Web page used in the Web interface for a Choice Node, and FIG. 8 is a pictorial representation of a Web page used in the Web interface for a Constraint Node.

A help function that generates the string to be given as the prompt to the user. An example, in pseudo code form is also shown in FIG. 6.

A grammar function that enables the correct set of grammar rules; this function is only needed for automatic speech recognition-based interfaces. An example, in pseudo code form is shown in FIG. 9.

As indicated, FIG. 6 shows, in pseudo code form, portions of the prompt and help functions shared by an automatic speech recognition-based interface, web-based interface and telephone-based voice interface for the Any-Time Teller banking service. Portions of the grammar rules, against which the automatic speech recognition engine will parse spoken input from the user, are shown in FIG. 9. Again, FIG. 10 illustrates a portion of the associated grammar function shared by an automatic speech recognition-based interface and a telephone-based voice interface.

From these functions and grammars, the SISL infrastructure automatically coordinates the collection and event transformation mechanisms, and integrates the user interface with the service logic and the service monitor. For automatic speech recognition-based interfaces, the SISL infrastructure automatically generates a desktop interface based on JAVA Speech API (Application Programming Interface). To enable telephone-based voice access to the service, SISL automatically generates VoxML pages, which specify the voice dialog to be carried out on a telephony platform. For Web-based interfaces, the SISL infrastructure automatically generates HTML (Hypertext Markup Language) pages. It is noted that SISL provides a mechanism for the UI designer to customize the look and feel of the interface.

Figure 2:
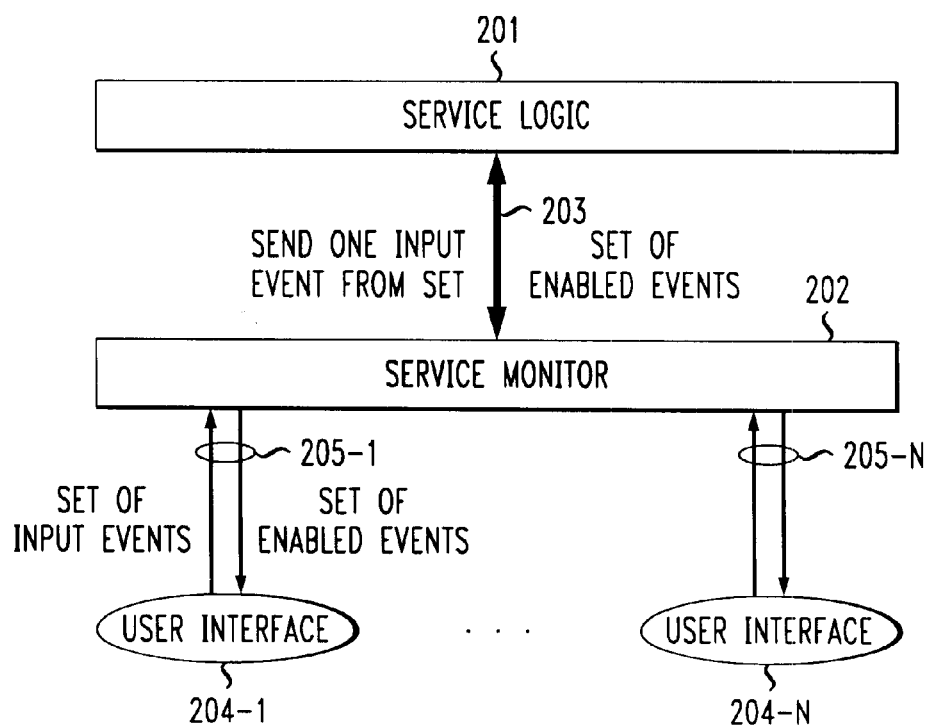
FIG. 2 shows, in simplified block form, details of the SISL (Several Interfaces, Single Logic) architecture employed in the embodiment of FIG. 1.

FIG. 2 shows, in simplified block form, details of the SISL (Several Interfaces, Single Logic) architecture employed in the embodiment of FIG. 1. The SISL architecture together with the event communication protocol provides modularity between the service logic 201 and user interfaces 204. In particular, two features of the event communication protocol allow service logic 201 to function completely without knowledge of the specifics of the individual user interfaces 204. These features are: (1) events are multicast from service logic 201 via service monitor 202 to user interfaces 204 and, consequently, service logic 201 does not need to know the destinations of these events; and (2) the source of the events from the user interfaces 204 is not recorded and, consequently, the service logic 201 does not know which one or more of user interfaces 204 sent the events. Service monitor 202 is responsible for maintaining this communication protocol. This modularity allows service providers to provide interchangeable user interfaces 204, or add new ones, to a single consistent source of service logic and data.

Specifically, shown in FIG. 2 are service logic unit 201, service monitor 202 and user interfaces 204-1 through 204-N. The key principle underlying SISL is that all user interfaces 204 to a service share a single service logic 201. All communications between the service logic 201 and its multiple user interfaces 204 are through events, via a service monitor 202. Events from the service logic 201 are broadcast to the user interfaces 204 via 203 to the service monitor 202 and, then, via 205 as a set of enabled events to the user interfaces 204. At the outset of the service, for example the Any-Time Teller banking service, each user interface 204 registers with the service monitor 202 to indicate which events it is interested in receiving. After collecting information from the user, the user interfaces 204 send events to the service monitor 202 via bi-directional links 205; the service monitor 202 does not record the source of these events. The service monitor 202 passes the events, one at a time, via 203 to the service logic 201. Details of a service monitor, which can be advantageously employed for service monitor 202, are described in co-pending U.S. patent application Ser. No. 09/386,093 (T. J. Ball et al.) filed concurrently herewith and assigned to the assignee of this application.

Event communication supports decoupling of the service logic 201 and the user interfaces 204, and allows service providers to provide interchangeable user interfaces 204, or add new ones, to a single consistent source of service logic 201 and data.

In each round of interaction, the SISL infrastructure automatically sends out a set of events via 203 from the service logic 201 to the service monitor 202, corresponding to the events that are currently enabled in the service logic 201. There are three kinds of events: prompt events, up events, and notify events. Prompt events indicate to the user interface what information to communicate to the user and what information the service is ready to accept. There are three kinds of prompt events:

prompt_choice events are disjunctive choices currently enabled in the service logic 201. For example, after the user has successfully logged into the Any-Time Teller banking service, a choice among the different transaction types is enabled. The service logic 201 sends a prompt_choice_deposit, prompt_choice_withdrawal event, and a prompt_choice_transfer event, and so forth, via 203 to the service monitor 202.

prompt_req events are the events currently required by the service logic 201. For example, suppose the user has chosen to perform a transfer transaction. The Any-Time Teller requires that the user input a source account, a transfer account, and amount, and hence sends prompt_req_src, prompt_req_tgt, and prompt_req_amt events via 203 to the service monitor 202.

prompt_opt events are events enabled in the service logic 201, for which the user may correct previously given information. For example, suppose the user is performing a transfer and has already provided his/her source and target accounts, but not the amount. The service logic 201 sends prompt_opt_src, prompt_opt_tgt, and prompt_req_amt events via 203 to the service monitor 202. This indicates that the user may override the previously given source and target accounts with new information.

Up events correspond to prior points in the service logic 201 to which the user may go back. For example, the service logic 201 sends an up_MainMenu event via 203 to the service monitor 202. This allows the user to abort any transaction and go back up to the main menu.

Notify events are simply notifications that the user interface 204 should give the user; for example, that a transaction has completed successfully or that information provided by the user was incorrect or inconsistent.

Figure 3:
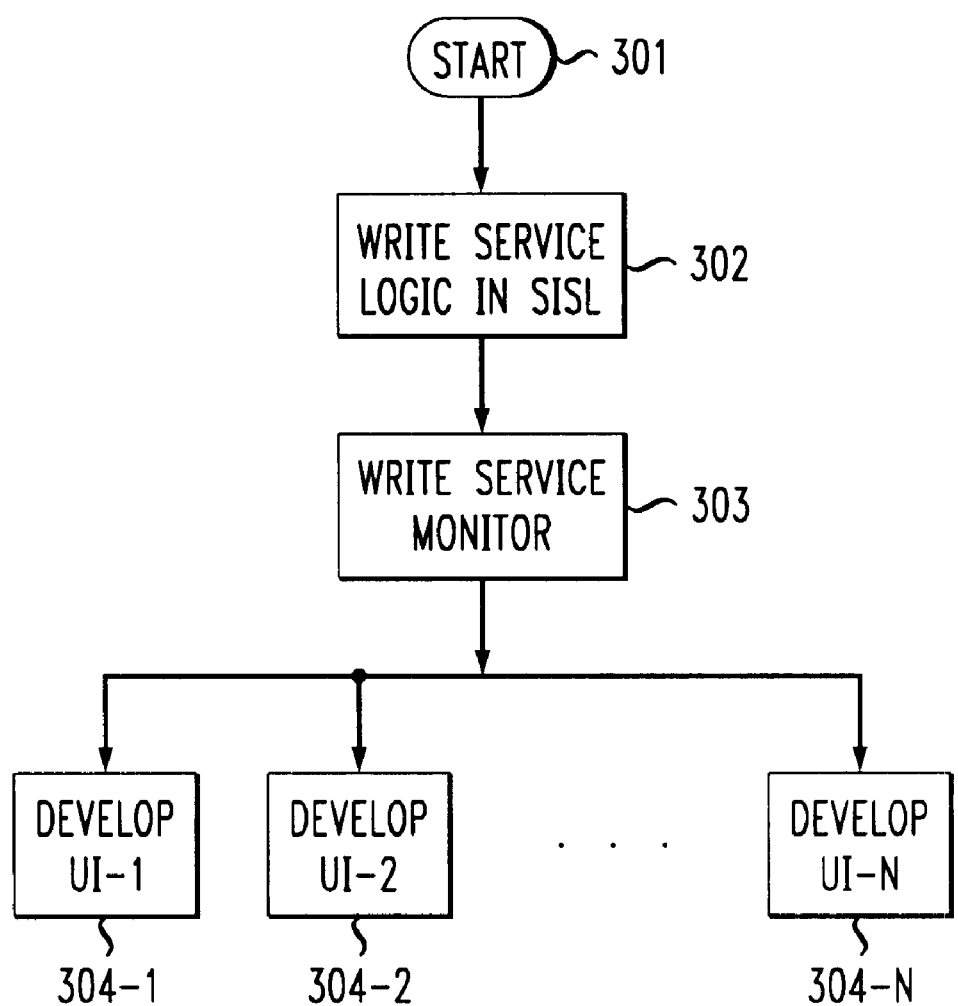
FIG. 3 is a flowchart illustrating the steps in implementing the SISL architecture of FIG. 2.

FIG. 3 is a flowchart illustrating the steps in implementing the SISL architecture of FIG. 2. Specifically, the implementation process is started via step 301. Then, step 302 causes the SISL logic to be written in SISL. Step 303 causes the service monitor 202 to be written. Thereafter, a plurality of user interfaces UI-1 thorough UI-N are developed in steps 304-1 through 304-N.

Figure 4:
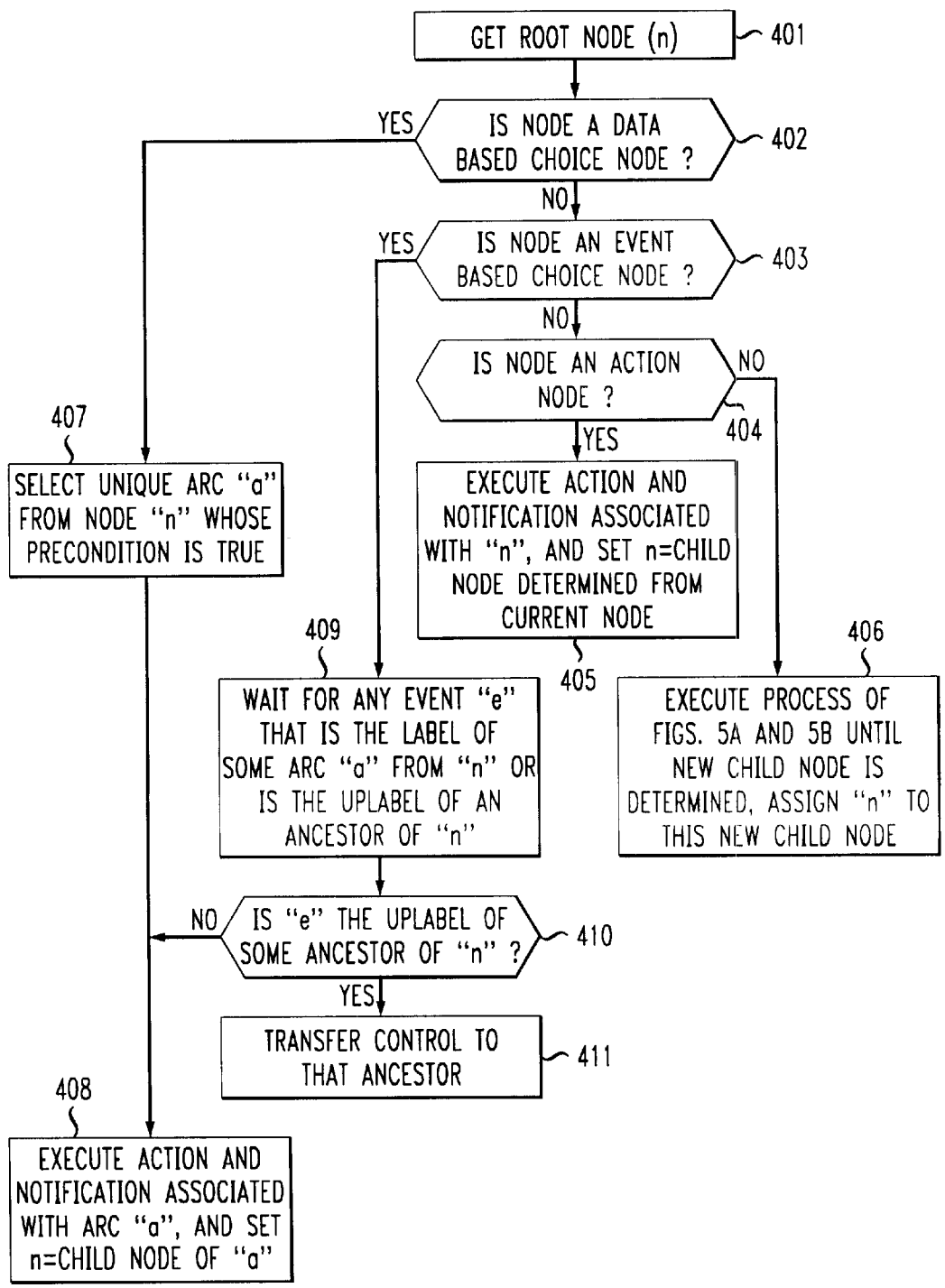
FIG. 4 is a flowchart illustrating the steps in the process of executing reactive constraint graphs.

FIG. 4 is a flowchart illustrating the steps in the process of executing reactive constraint graphs. Specifically, step 401 obtains a root node (n). Then step 402 tests to determine if the obtained node is a data based choice node. If the test result in step 402 is No, step 403 tests to determine whether the obtained node is an event based choice node. If the tests result in step 403 is NO, step 404 tests to determine if the obtained node is an action node. If the test result in step 404 is YES, step 405 causes the execution of the action, the execution of the notification associated with node "n" and sets "n=child node", as determined from the current obtained node. If the test result in step 404 is NO, step 406 causes the execution of the process of the constraint flowchart of FIG. 5, as described below, until a new child node is determined and, then, assigns "n" to the determined new child node. Returning to step 402, if the test result is YES, the node is data based, and step 407 causes a unique arc "a" to be selected from node "n" whose precondition is TRUE. Then step 408 causes the execution of an action and notification associated with arc "a". Thereafter, step 408 sets "n=child" node of "a". Returning to step 403, if the test result is YES, the node is event based, and step 409 causes a wait for any event "e" that is the label of some arc "a" from node "n" or is the uplabel of some ancestor node of node "n". Then, step 410 tests to determine if event "e" is the uplabel of some ancestor node of node "n". If the test result in step 410 is YES, step 411 causes control to be transferred to the ancestor node. If the test result in step 410 is NO, control is passed to step 408, which is then effected as described above. Reactive constraints are discussed further below.

Figure 5A:
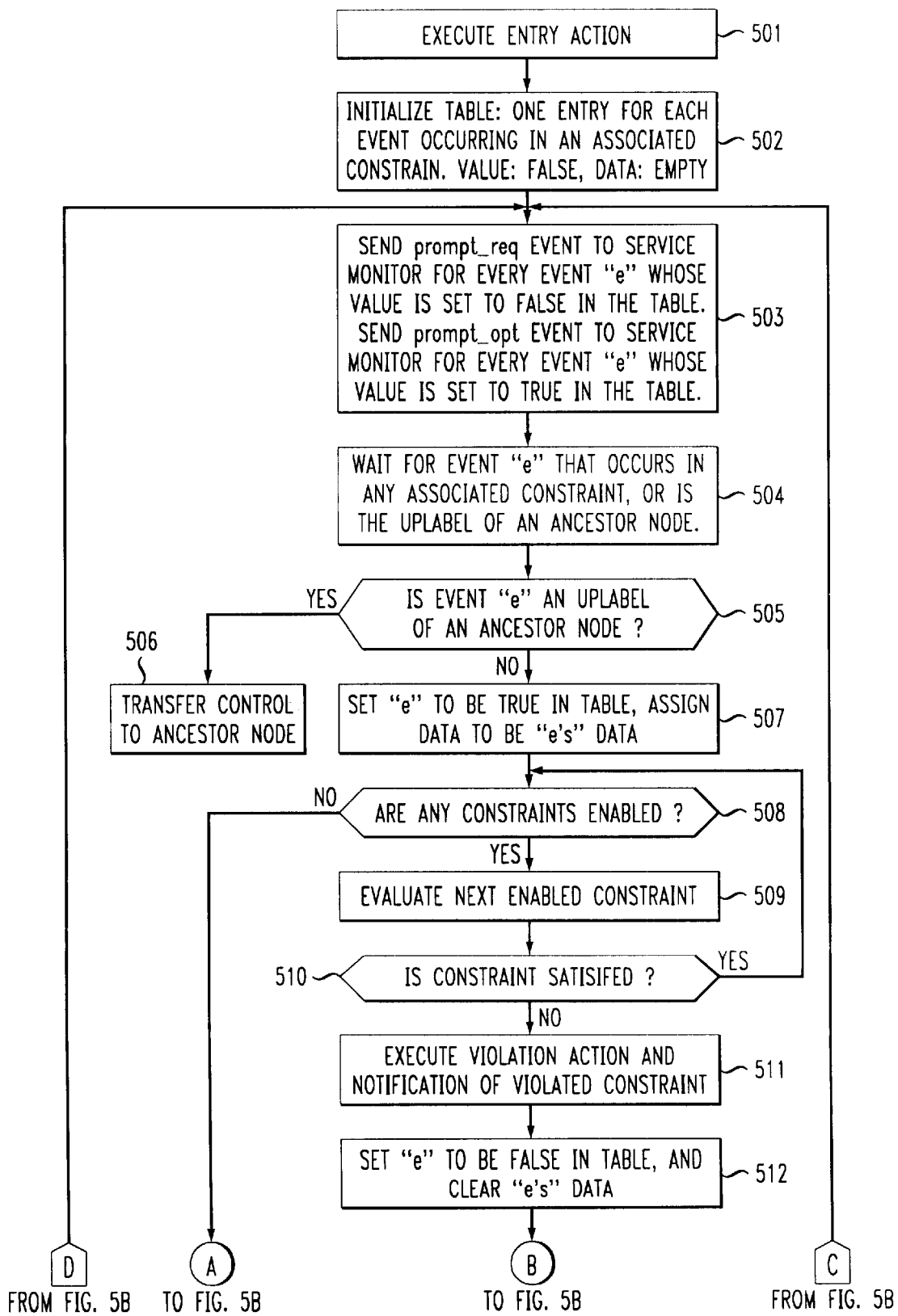
FIG. 5A and FIG. 5B when connected A—A, B—B, C—C, and D—D is a flowchart illustrating the steps in the process of executing constraint nodes.
Figure 5B:
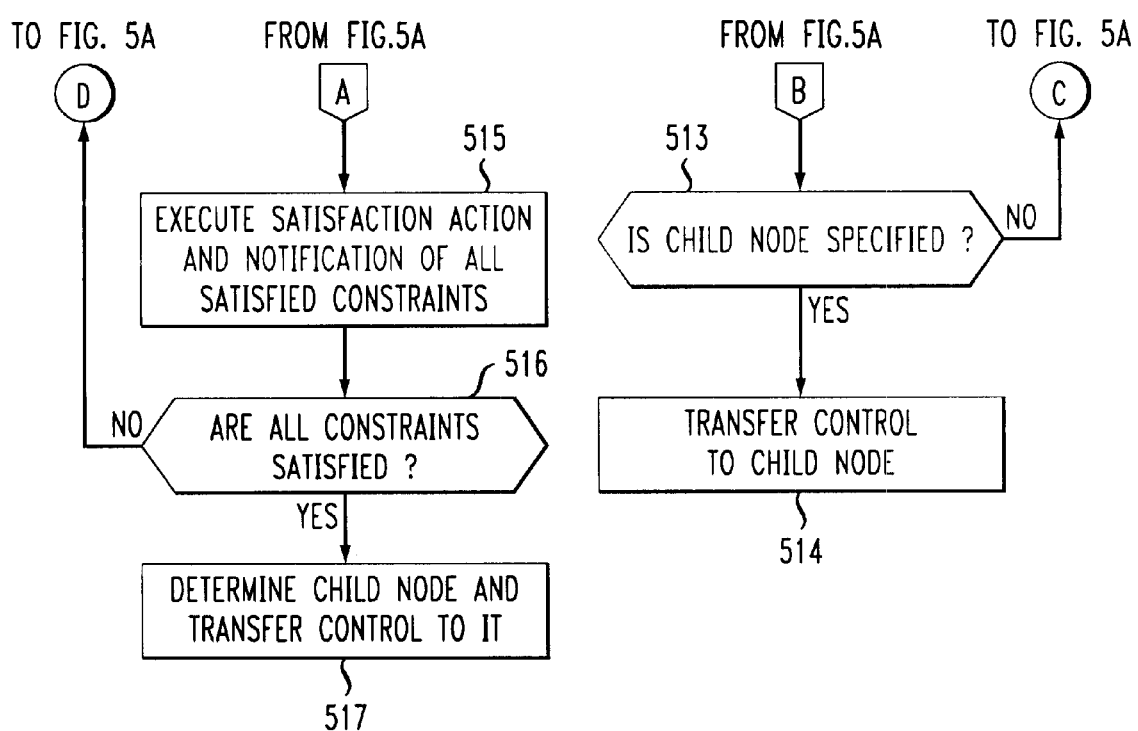

FIG. 5A and FIG. 5B when connected A—A, B—B, C—C, and D—D is a flowchart illustrating the steps in the process of executing constraint nodes. Specifically, step 501 causes the entry action to be executed. Then, step 502 causes initialization of a table to be one entry for each event occurring in an associated constraint; value to FALSE; and data to EMPTY. Thereafter, step 503 causes a prompt_req to be sent to service monitor 202 for every event "e" whose value is set to FALSE in the table, and a prompt_opt to be sent to service monitor 202 for every event "e" whose value is set to TRUE in the table. Step 504 waits for an event "e" that occurs in any associated constraint, or is the uplabel of an ancestor node. Then, step 505 tests to determine whether event "e" is an uplabel of an ancestor node. If the test result instep 505 is YES, control is transferred to the ancestor node via step 506. If the test result in step 505 is NO, step 507 causes event "e" to be set TRUE in the table, and assigns data to be "e's" data. Then, step 508 tests to determine if any constraints are enabled. If the test result in step 508 is YES, step 509 causes the next enabled constraint to be evaluated. Then, step 510 tests to determine whether the evaluated constraint has been satisfied. If the test result in step 510 is NO, the constraint is not satisfied and step 511 causes the execution to be effected of the violation action and the notification of violated constraint. Step 512 causes the setting of event "e" to be False in the table and clears "e's" data. Thereafter, step 513 tests to determine if a child node is specified. If the test result instep 513 is YES, step 514 causes control to be transferred to the specified child node. Returning to step 508, if the test result is NO, there are no remaining constraints that are enabled and step 515 causes the execution of the satisfaction action and the notification of all satisfied constraints. Then, step 516 tests to determine whether all constraints have been satisfied. If the test result in step 516 is YES, step 517 causes the child node to be determined and, then, transfers control to it. If the test result in step 516 is NO, control is returned to step 503 and appropriate ones of steps 503 through 517 are iterated until either step 506 is reached, or step 514 is reached, or step 517 is reached. Returning to step 510, if a YES result is obtained, control is returned to step 508 and steps 508 through 510 are iterated until either step 508 yields a NO result or step 510 yields a NO result. Then, the processes, as described above regarding steps 508 or 510 yielding a NO result are repeated. Returning to step 513, if the test result is NO, the child node is not specified and control is returned to step 503. Thereafter, appropriate ones of steps 503 through 517 are iterated until either step 506, or step 514 or step 517 is reached.

FIG. 6. illustrates in pseudo code form a portion of an automatic speech recognition (ASR) interface and a Web user interface employed in the Any-Time Teller example. The pseudo code of FIG. 6 is self explanatory and is as follows:

```
prompt(req_events, opt_events, choice_events, uplabels){
    . . .
    if(req_events.contains_any_of("startDeposit",
    "startWithdrawal", "startTransfer", "startBalance")
    {return("What transaction would you like to do?");
    };
    . . .
    if(req_events.contains("startTransfer")) transaction_
    type.set("Transfer");
    . . .
    if(transaction_type.equals("Transfer")){if(req_
    events.contains({"src", "tgt", "amount"})){return
    ("Please specify the source account, target account, and
    the amount you would like to transfer.")
    }
    . . .
    };
}
help(req_events, opt_events, choice_events, uplabels){
```

```
    if(req_events.contains_any_of("startDeposit",
    "startWithdrawal", "startTransfer", "startBalance")
    {return("You may make a deposit, withdrawal or transfer.
    Or you may quit the service");
    }
}
```

FIG. 9 shows in pseudo code form a portion of the ASR interface grammar used in the Any-Time Teller example. The pseudo code of FIG. 9 is self explanatory and is as follows:

<request>=([I (want to|would like to)]|I'd like to )|please;

<transfer_request>=[<request>](make a transfer|transfer [money]){startTransfer};

public<transfer>=<transfer_request>[<src_tgt_amount>|<src_tgt>|<src_amount>|<tgt_amount>|<src>|<tgt>|<amount>];

public<src_tgt_amount>=[<transfer_request>] (<sum>from[my]<account_type>{src}[account](to|into) [my]<account_type>{tgt}[account]|<sum>(to into)[my] <account_type>{tgt}[account]from[my]<account_type>{src}[account])|from[my]<account_type>{src} [account], [<transfer_request>](<sum>) (to|into)[my] <account type>{tgt}[account];

public<src_amount>=[<transfer_request>](<sum>from [my]<account_type>{src}[account])|from[my] <account_type>{src}[account], [<transfer_request>] (<sum>);

...

<uprequest>=[<request>][go][(back[up])|up][to][the];

public<upMainMenu>=[<uprequest>]Main Menu {upMainMenu};

FIG. 10 shows in pseudo code form a portion of an ASR User interface employed in the Any-Time Teller example. The pseudo code of FIG. 10 is self explanatory and is as follows:
```
enableRules(req_events, opt_events, choice_events, uplabels){evts=req_events+opt_events+choice_events+uplabels;

if(evts.contains({"src", "tgt", "amount"}))
       {grammar.enable("<src_tgt_amount>");
    }
    if(evts.contains({"src", "amount"})){grammar.enable
       ("<src_amount>");
    }
    ...
    if(uplabels.contains("upMainMenu")){grammar.enable
       ("<upMainMenu>");
    }
}
```

Figure 11:
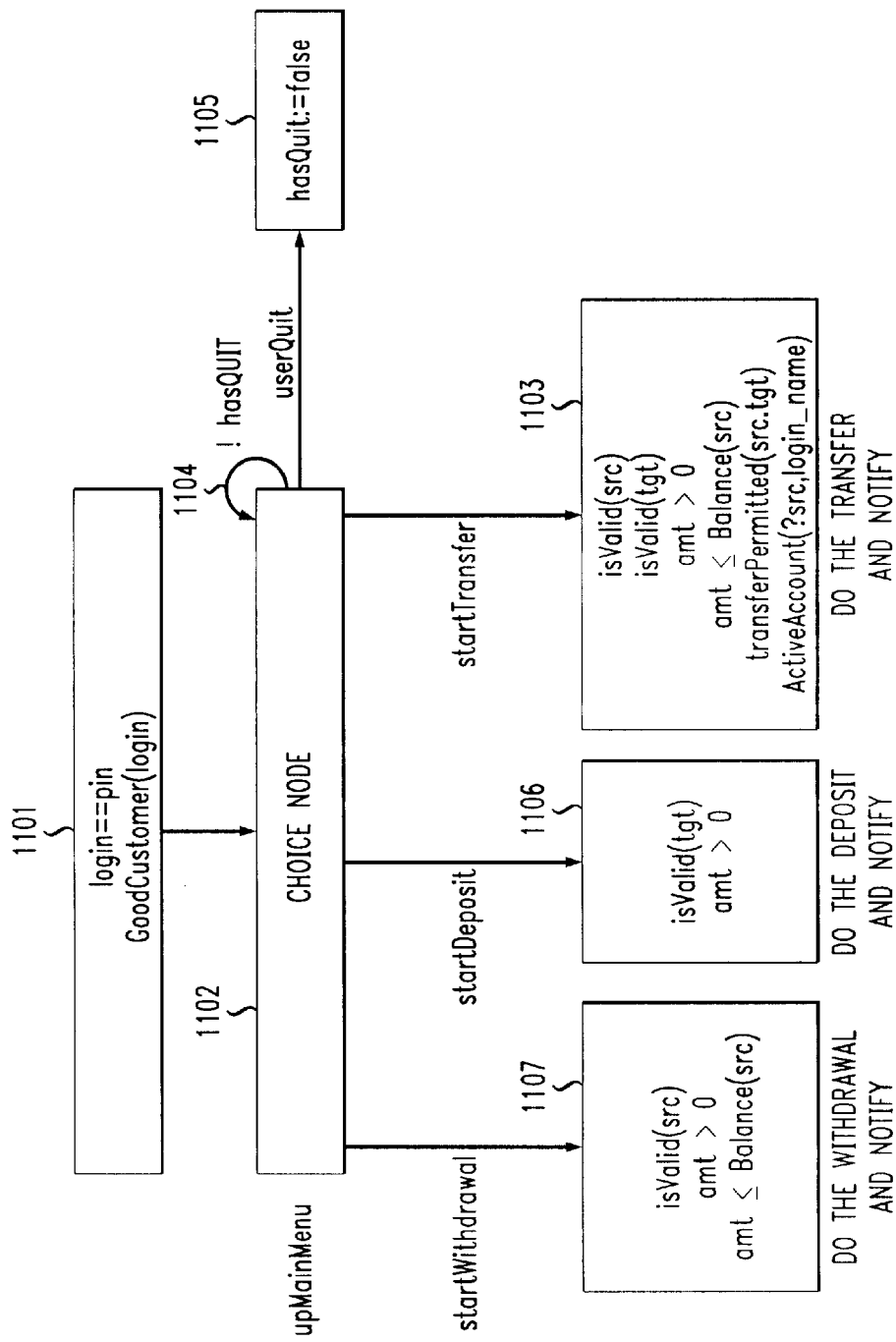
FIG. 11 is a flow diagram illustrating a reactive constraint graph for a portion of the Any-Time Teller banking service example.

FIG. 11 is a flow diagram illustrating a reactive constraint graph for a portion of the Any-Time Teller banking service example.

In SISL, the service logic 201 (FIG. 2) of an application is specified as a reactive constraint graph, which is a directed acyclic graph with an enriched structure on the nodes. The traversal of reactive constraint graphs is driven by the reception of events from the environment; these events have an associated label, i.e., the event name, and may carry associated data. In response, the graph traverses its nodes and executes actions; the reaction of the graph ends when it needs to wait for the next event to be sent by the environment. For example, FIG. 11 shows a SISL reactive constraint graph that implements part of the functionality of the Any-Time Teller.

Structure and Behavior

Reactive constraint graphs can have three kinds of nodes, namely, choice nodes, constraint nodes and action nodes.

Choice Nodes

These nodes represent a disjunction of information to be received from the user. Every choice node has a specified set of events. There are two forms of choice nodes, namely, event-based and data-based. Every event-based choice node has a specified set of events. For every event in this set, the SISL infrastructure automatically sends out a corresponding prompt_choice event from the service logic 201 to the user interface, via the service monitor 202. The choice node waits for the user interface to send, via the service monitor 202, any event in the specified set. When such an event arrives, the corresponding transition is taken, and control transfers to the descendent, i.e., child, node.

For example, if a startTransfer event arrives when control is at the choice node, the corresponding transition is taken and control is transferred to the target constraint node. To ensure determinism, all outgoing transitions of a choice node must be labeled with distinct event names.

Every data-based choice node has a specified set of preconditions on data. To ensure determinism, these preconditions must be specified so that exactly one of them is "true" in any state of the system. When control reaches a data-based choice node, the transition associated with the unique "true" precondition is taken, and control is transferred to the child node.

Constraint Nodes

The constraint nodes represent a conjunction of information to be received from the user. Every constraint node has an associated set of constraints on events. Constraints have the following components:

The signature is the set of events occurring in the constraint.

The evaluation function is a boolean function on the events in the signature.

The optional satisfaction tuple consists of an optional action, not involving user interaction, and an optional notify function that may return a notify event with an associated message. If the constraint evaluates to true, the action is executed, the notify function is executed and the returned notify event is sent to the user interface via the service monitor 202.

The optional violation tuple consists of an optional action, not involving user interaction, an optional notify function that may return a notify event with an associated message, an optional uplabel function that may return the uplabel of an ancestor node and an optional child node. If the constraint evaluates to "false", the action is executed, the notify function is executed and the returned notify event is sent to the user interfaces 204 via the service monitor 202. The uplabel function is also executed; if it returns an ancestor's uplabel, it is generated, and hence control reverts back to the ancestor node. If no ancestor node's uplabel is returned and a child node is specified, control is transferred to the specified child node.

For example, amt<=Balance (src) of 1107 in FIG. 11 is equivalent to ?amt<=Balance(?src) in FIGS. 12A and 12B, and is the evaluation of constraint (c4) of FIGS. 12A and 12B, as described below. The signature of this constraint is the set {amt, src}, and the satisfaction notify function and violation notify function, respectively, report to the user whether or not the source account has enough funds to cover the requested amount. The notification ?EventName refers to the data on the event with name EventName.

Every constraint node has the following components:

An associated set of constraints. In the current semantics and implementation, this set is totally ordered, specifying the priority order in which the constraints are evaluated.

An optional entry action, not involving user interaction.

An optional finished tuple, consisting of an optional exit action, not involving user action, an optional notify function, an optional uplabel function and an optional child node.

A detailed description of constraint node execution is shown in FIGS. 13A and 13B and summarized below.

The SISL infrastructure automatically sends out a prompt_req event, from the service logic 201 (FIG. 2) to the user interfaces 204 via the service monitor 202, for every event that is still needed in order to evaluate some constraint. Additionally, the constraint node sends out a prompt_opt event for all other events mentioned in the constraints. These correspond to the information that can be corrected by the user.

In every round of interaction, the constraint node waits for the user interface to send, via the service monitor 202, any event that is mentioned in the signature of its associated constraints. Each constraint associated with a constraint node is evaluated as soon as all of its events have arrived. If an event is resent by the user interfaces 204, i.e., information is corrected, all constraints with that event in their signature are re-evaluated. For every evaluated constraint, its optional satisfied/violated action is automatically executed, and a notify event is automatically sent to the user interfaces 204, with the specified message.

Specifically, the constraints are evaluated in the specified priority order, currently the total ordered set. If any constraint is violated, the last received event is automatically erased from all constraints, since it caused an inconsistency. Furthermore, the violation action is executed, the notify function is executed and the returned notify event is automatically sent to the user interfaces 204 via the service monitor 202. The uplabel function is also executed; if it returns an ancestor's uplabel, it is generated and, hence control reverts back to that ancestor. For example, in FIG. 11, the constraint node 1103 for the transfer capability checks whether the source account is an active account of the given customer, i.e., user, via constraint (c0) of FIG. 12. If not, it generates the uplabel "LoginMenu", and control is transferred back to the Login node 1101. Then, the user must re-enter his/her login. If no ancestor node's uplabel is returned and a child node is specified, control is transferred to that child node. For example, in FIG. 11, the Login node 1101 checks whether the login is of a customer in good standing, via constraint good_customer of FIG. 12, which evaluates goodCustomer(login). If not, control is transferred to the Quit node and the service is terminated. If no ancestor node's uplabel is returned or child node specified for the violated constraint, the node reverts to waiting for events to arrive.

If no constraints have been violated, the action of every satisfied constraint is executed, the associated notify functions are executed and the returned notify events are sent to the user interfaces 204 via the service monitor 202.

When all the constraints have been evaluated and are satisfied, the exit action and notify function associated with the constraint node are executed and the returned notify event is sent to the user interfaces 204 via the service monitor 202. The uplabel function is also executed; if it returns an ancestor node's uplabel, it is generated, and hence control is returned back to the ancestor node. If no ancestor node's uplabel is returned and a child node it specified, control is transferred to that child node.

Action Nodes

These nodes represent some action, not involving user interaction, to be taken. After the action is executed, control transfers to the child node.

Nodes can have an optional "uplabel", which is used to transfer control from some child node back up to the node, allowing the user to revert back to previous points in the service. In each round of interaction, the SISL infrastructure automatically sends out an up event, from the service logic 201 to the user interfaces 204 via the service monitor 202, corresponding to the uplabel of every ancestor of the current node.

Nodes can also have a self-looping arc, with a boolean precondition on data. This indicates that the subgraph from the node will be repeatedly executed until the precondition becomes false.

An Example Execution of the Any-Time Teller Banking Service

By way of an example execution of the Any-Time Teller Banking Service as shown in FIG. 11, the SISL based invention shall be illustrated using the web-based, automatic speech recognition-based and telephone voice-based user interfaces 204 partially set forth in pseudo code in FIGS. 6, 9 and 10, respectively.

Logging into the Service

The service initially causes the statement "Welcome to Any-Time Teller" to be spoken. The control point is at the root node, which is a constraint node. For the constraint of the root node to be satisfied, the login and pin values must be identified, i.e., login==pin, as shown in step 1101 of FIG. 11. The SISL infrastructure automatically sends out a prompt_req_login and a prompt_req_pin from the service logic 201 to the user interfaces 204, via the service monitor 202. The user interfaces 204, via the prompt function, respond by saying "Please specify your login and personal identification number". For the Web-based user interface, text fields for the login and pin are automatically generated, in known fashion; for the speech recognition-based user interface, the grammars specified in the grammar function are automatically enabled.

In this example, suppose that the user states "My login is Mary Smith and my pin is Mary Smith", and hence a login event with the value "Mary Smith" and a pin event with the value "Mary Smith" are sent to the service logic 201. Since the login and pin are identical, the constraint is satisfied. The SISL infrastructure automatically sends out a notify event with the message "Hello Mary Smith". Welcome to the SISL Any-Time Teller". The user interface makes this statement to the user.

Login Successful

Control now proceeds to step 1102 and to the choice node. The SISL infrastructure automatically sends out:

prompt_choice_startDeposit;
  prompt_choice_startWithdrawal;
  prompt_choice_startTransfer; and
  prompt_choice_userQuit;

events from the service logic 201 (FIG. 2) to the user interfaces 204, via the service monitor 202, corresponding to the enabled choices. The user interfaces 204 ask the user "What Transaction would you like to do?" FIG. 7 shows a screen snapshot of the web-based user interface; the possible choices are shown as radial buttons. For an automatic speech recognition-based user interface, if the user states "I need help", the user interface states, via the help function shown in pseudo code form in FIG. 6, "You can make a withdrawal, deposit transfer or you can quit the service". Consider that the user now chooses to perform a transfer, the startTransfer event is sent to the service logic 201.

Transfer

Control now proceeds to constraint node 1106. The SISL infrastructure automatically sends out:
prompt_req_src;
prompt_req_tgt; and
prompt_req_amt
events from the service logic 201 to the user interfaces 204, via the service monitor 202, together with a up_MainMenu event, since it is the uplabel of an ancestor node. Assume that the user respond with "I would like to transfer One Thousand Dollars ($1,000.00) from my checking account", or equivalently "From checking, I would like to transfer One Thousand Dollars ($1,000.00)". Either order of the transfer request information is allowed; furthermore, this information in partial, since the target account is not specified. The user interface 204 sends a src event and an amt event, with the corresponding data, to the service monitor 202, which sends them one at a time to the service logic 201. Assume that the src event is sent first, followed by the amt event. The constraints amt>o, isValid(src) and amt<=Balance (src) are automatically evaluated.

Assume that the checking account does not have a balance of at least $1,000.00; hence, there is a constraint violation and the supplied information is erased, since it was sent last. Note that constraints are evaluated as soon as possible; for example, the user is not required to specify a target account in order for the balance on the source account to be checked. The SISL infrastructure then automatically sends out a prompt_opt_src, prompt_req_tgt, prompt_req_amt and upMainmemu events from the service logic 201 to the user interfaces 204, via the service monitor 202, as well as, a notify event with the message "Your checking account does not have sufficient funds to cover the amount of $1,000.00. Please specify an amount and a target account." The user interface 204 then notifies the user with this message and prompts the user for the information.

Assume now that the user states "Transfer Five hundred Dollars ($500.00) to savings". The amt and tgt events are sent to the service monitor 202, and passed to the service logic 201. The constraints are now all evaluated and satisfied, the service logic 201 automatically sends a notify event to the user interfaces 204 with the message "Your transfer of $500.00 from checking to savings was successful".

Control then is returned back up to the choice node 1102; the loop on the incoming arc to the choice node indicates that the corresponding subgraph is repeatedly executed until the condition on the arc becomes false. If the user wants to quit the service, the userQuit event is sent to the service logic 201, the hasQuit variable is set to true, and the loop is terminated. While in step 1102, a loop step 1104 is performed to test if the user has terminated, i.e., quit, the session.

Back Up to the Main Menu

If the user would like to abort at any time during a withdrawal, deposit or transfer transaction, he/she can state "I would like to go back up to the Main Menu", which results in an up_MainMenu event to be sent to the service logic 201. This causes control to be returned to the choice node 1102, which has an associated upMainMenu label.

Make a Deposit

If a user wishes to make a deposit control proceeds to the deposit constraint node 1106. The SISL infrastructure automatically sends out
prompt_req_tgt,
prompt_req_amt
events from the service logic 201 to the user interfaces 204 via service monitor 202. If the target account is valid and the amount is greater than zero (0) the deposit is made and the associated notification is executed.

Make a Withdrawal

If a user wishes to make a withdrawal control proceeds to the deposit constraint node 1107. The SISL infrastructure automatically sends out:
prompt_req_src,
prompt_req_amt
events from the service logic 201 to the user interfaces 204 via service monitor 202. If the source account is valid and the amount is greater than zero (0), it is determined if amt<=Balance(src) and, if so, the withdrawal is made and the associated notification is executed.

FIG. 12A and FIG. 12B, when connected X—X, illustrate in pseudo code form the steps of a portion of the SISL service unit process used in the Any-Time Teller banking service example. The pseudo code of FIGS. 12A and 12B is self explanatory and is as follows:

c0=Constraint(signature: {src},
  eval: ActiveAccount(?src,login_name),
    violation: notify("Sorry, this account is not active. Please log into the service again.");
    ancestor_uplabel: LoginMenu;);

c1=Constraint(signature: {src},
  eval: AccountValid(?src),
    violation: notify("Sorry,"+?src+" is not a valid account."));

c2=Constraint(signature: {tgt},
  eval: AccountValid(?tgt),
    violation: notify("Sorry,"+?tgt+"is not a valid account."));

c3=Constraint(signature: {amt},
  eval: ?amt>0,
    violation: notify("Sorry,"+?amt+"is not a positive amount."));

c4=Constraint(signature: {src, amt},
  eval: ?amt<=Balance(?src),
    satisfaction: notify("Your"?src+"account has sufficient funds to cover the amount of"+?amt+"dollars.",
    violation: notify("Sorry, your"?src+"account does not have sufficient funds to cover the amount of"+?amt+"dollars."));

c5=Constraint(signature: {src, tgt},
  eval: TransferPermitted(src, tgt),
    violation: notify("Sorry, transfers are not allowed between"+?src+"account and"+?tgt+"account."));

Transfer=ConstraintNode(constraints: {c0, c1, c2, c3, c4, c5};
  exit_action: makeTransfer(?src, ?amt, ?tgt);

notify("We have transferred"+?amt+"dollars from your"+
?src+"account to your"+?tgt+"account"));

Withdrawal=ConstraintNode( . . . ); Deposit=
ConstraintNode( . . . );

Quit=ActionNode(action: hasQuit=true; notify
("Goodbye.");)

MainMenu=ChoiceNode(children: {(startTransfer, Transfer), (startWithdrawal, Withdrawal),
(startDeposit, Deposit), (userQuit, Quit)},
loop_condition: !hasQuit,
uplabel: upMainMenu);
login_pin=Constraint(signature: {login, pin},
eval: login==pin,
satisfaction: action(login_name=?login);
violation: notify("Sorry, your login and pin combination is not valid.");)

good_customer=Constraint(signature: {login},
eval: goodCustomer(login),
violation: notify("Sorry, you cannot access your accounts using this service.");
child: Quit);

Login=ConstraintNode(constraints: {good_customer, login_pin},
notify("Welcome"+getName(?login)),
child: MainMenu,
uplabel: LoginMenu);

StartService=ActionNode(action: hasQuit=false;
notify("Welcome to the Sisl Any-Time Teller");
child: Login), FIG. 13A and FIG. 13B, when connected Y—Y, illustrate the steps performed in the execution of constraint nodes. The procedure of a constraint node is as follows:

1. The node first executes its (optional) entry action. It then creates a table in which every event in the signature of a constraint associated with the node has a slot. Each such event has a single slot in the table, even if it occurs in multiple constraints. Each slot in the table contains three fields: the name of the event, the data associated with the event when it arrives, and a boolean variable that indicates whether the event arrived from the environment and did not cause a constraint violation. The data field of every slot is initially empty and the boolean variable in every slot is initially false.

2. The node sends a prompt_req event to the user interfaces (via the service monitor)—for every event "e" whose boolean variable is set to false in the table.

3. The node sends a prompt_opt event to the user interfaces (via the service monitor)—for every event "e" whose boolean variable is set to true in the table.

4. The node then waits for any event that is in the signature of any constraint associated with the node, i.e., has a slot in the table or is the uplabel of any ancestor node.

5. Upon arrival of any such event "e", if "e" is the uplabel of some ancestor node, control is transferred to that ancestor. Otherwise:

(a) The boolean variable in the slot for "e" is set to true. The data associated with the event "e" is written in the table; if previous data is present, it is first erased.

(b) The enabled constraints "c" are those that satisfy the following conditions:
The event "e" occurs in the signature of the constraint "c".
All events in the signature of the constraint "c" have their boolean variables set to true in the table.

(c) The enabled constraints "c" are evaluated in the specified priority order:
If the first/next constraint c in priority order is violated.
Its (optional) violation action and notify function are executed, and the returned notify event is sent to the user interfaces via the service monitor.
The boolean variable in the slot for "e" is reset to false, and the data field is reinitialized to be empty.
The uplabel function of constraint "c" is executed (if it is specified). If it returns the uplabel of an ancestor node,
The uplabel is generated and control is transferred to the ancestor node.
Else if the constraint has a specified child node.
Control is transferred to the specified node.
Else the constraint node goes back to waiting for events, (step 2).
Else the next enabled constraint is evaluated. If none remain to be evaluated, the constraint node goes to step5(d).
(d) If all enabled constraints were satisfied,
The (optional) satisfaction action and notify function of each satisfied constraint are executed, and the returned notify events are sent to the user interface via the service monitor.
If all constraints associated with the node were enabled and satisfied.
The (optional) exit action and notify function are executed and the returned notify event is sent to the user interfaces via the service monitor.
The uplabel function of the constraint node is executed (if it is specified). If it returns the uplabel of an ancestor node,
The uplabel is generated and control is transferred to the ancestor node.
Else if the constraint node has a specified child node,
Control is transferred to the specified node.
Else the constraint node goes back to waiting for events, (step 2).

The above-described embodiment is, of course, merely illustrative of the principles of the invention. Indeed, numerous other methods or apparatus may be devised by those skilled in the art without departing from the spirit and scope of the invention. For example, SISL may be advantageously implemented using an eXtensible Markup Language (XML). XML is a metalanguage for defining mark-up languages such as HTML. SISL can be implemented by defining an XLM Document Type Declaration (DTD), corresponding to a grammar for reactive constraint graphs. SISL services are then specified in XML using DTD, and the SISL implementation of the service is automatically generated by the SISL infrastructure.

What is claimed is:

1. Apparatus for use in providing an interactive user service comprising:
a service logic unit for providing data and logic to a plurality of user interfaces, wherein at least one of said user interfaces has natural language understanding; and
wherein said logic includes a service logic for facilitating effecting at least one or more of different functions from a set of functions including at least different ordering of inputs from any of said user interfaces, incomplete information from any of said user inputs from any of said user interfaces, incomplete information from any of said user interfaces, correction of information from any of said user interfaces by enabling a user to change previously provided inputs, returning of control to prior points in said interactive service in response to a request from at least one of said user interfaces, without having to restart the interactive user service application, said service logic further implements reactive constraint graphs having a plurality of nodes, wherein each of said nodes contains a set of constraints on execution of events of said node, and said service logic further evaluates whether enabled constraints in said set of constraints for a node have been satisfied.

2. The invention as defined in claim 1 wherein said service logic provides natural language understanding interaction with at least one user through said at least one user interface having natural language understanding.

3. The invention as defined in claim 2 wherein said service logic passes control from a first node to a second mode in accordance with prescribed criteria of said enabled constraints.

4. The invention as defined in claim 3 wherein said second node is a derivative node from said first node.

5. The invention as defined in claim 3 wherein said service logic passes control from said first node to said second node only when all of said enabled constraints in said set of constraints on said first node have been satisfied.

6. The invention as defined in claim 3 wherein said service logic passes control from said first node to said second node upon a determination that an enabled constraint has been violated.

7. The invention as defined in claim 2 wherein said service logic support a set of constraints allowing a significant number of possible different ordering of inputs to said service logic unit.

8. The invention as defined in claim 2 wherein said service logic causes evaluation of enabled constraints in said set of constraints prior to all of said constraints being enabled, whereby use of incomplete information is supported.

9. The invention as defined in claim 2 wherein said service logic supports correction of information by updating information in said constraint set upon receiving any new information.

10. The invention as defined in claim 2 wherein said service logic supports labeling of said nodes, whereby control is allowed to revert back to prior labeled nodes in the process when a current labeled node is a derivative node of a prior labeled node.

11. The invention as defined in claim 2 wherein said service logic further implements reactive constraint graphs having a plurality of nodes, wherein said plurality of nodes includes one or more constraint nodes, choice nodes, action nodes.

12. The invention as defined in claim 11 wherein said choice nodes represent a disjunction of information to be received from a user interface.

13. The invention as defined in claim 12 wherein each of said choice nodes is either event based or data based.

14. The invention as defined in claim 13 wherein each of said event based choice nodes has a specified set of events.

15. The invention as defined in claim 13 wherein each of said data based choice nodes has a specified set of preconditions on data.

16. The invention as defined in claim 11 wherein each of said constraint nodes has an associated set of constraints on events.

17. The invention as defined in claim 16 wherein each constraint has at least a signature component and an evaluation component.

18. The invention as defined in claim 17 wherein said signature component includes a set of events occurring in an associated constraint.

19. The invention as defined in claim 18 wherein said evaluation component includes a boolean function on said events in said signature.

20. The invention as defined in claim 1 further including a service monitor unit for controlling communication of inputs between said service logic unit and said user interfaces.

21. The invention as defined in claim 20 wherein said communication is of events.

22. The invention as defined in claim 21 wherein said service monitor unit receives a set of events from at least one user interface and controllably supplies said received events in a prescribed order to said service logic unit.

23. The invention as defined in claim 22 wherein said service monitor unit supplies said events in said set of events one at a time in said prescribed order to said service logic unit.

24. The invention as defined in claim 23 wherein said service logic in response to said supplied events controllably generates enabled events.

25. The invention as defined in claim 24 wherein said enabled events are supplied to said service monitor unit and wherein said service monitor unit supplies said enabled events in a prescribed fashion to all appropriate ones of said user interfaces.

26. A system for providing an interactive user service comprising:

a plurality of user interfaces, wherein at least one of said user interfaces has natural language understanding; and a service logic unit for providing data and logic to said plurality of user interfaces, wherein said logic includes a service logic for facilitating effecting at least one or more of different functions from a set of functions including at least different ordering of inputs from any of said user interfaces, incomplete information from any of said user interfaces, correction of information from any of said user interfaces by enabling a user to change previously provided inputs, returning of control to prior points in said interactive service in response to a request from at least one of said user interfaces, without having to restart the interactive user service application, said service logic further implements reactive constraint graphs having a plurality of nodes, wherein each of said nodes contains a set of constraints on execution of events of said node, and said service logic further evaluates whether enabled constraints in said set of constraints for a node have been satisfied.

27. The system as defined in claim 26 further including a service monitor unit for controlling communication of inputs between said service logic unit and said user interfaces.

28. The system as defined in claim 27 wherein said communication is of events.

29. The system as defined in claim 28 wherein said service logic provides natural language understanding interaction with at least one user through said at least one user interface having natural language understanding.

30. The system as defined in claim 29 wherein said service logic passes control from a first node to a second node in accordance with prescribed criteria of said enabled constraints.

31. The system as defined in claim 30 wherein said second node is a derivative node from said first node.

32. The system as defined in claim 30 wherein said service logic passes control from said first node to said second node only when all of said enabled constraints in said set of constraints on said first node have been satisfied.

33. The system as defined in claim 30 wherein said service logic passes control from said first node to said second node upon a determination that an enabled constraint has been violated.

34. The system as defined in claim 29 wherein said service logic supports a single set of constraints allowing a significant number of possible different ordering of inputs to said service logic unit.

35. The system as defined in claim 29 wherein said service logic causes evaluation of enabled constraints in said set of constraints prior to all of said constraints being enabled, whereby use of incomplete information is supported.

36. The system as defined in claim 29 wherein said service logic supports correction of information by updating information in said constraint set upon receiving any new information.

37. The system as defined in claim 29 wherein said service logic supports labeling of said nodes, whereby control is allowed to revert back to prior labeled nodes in the process when a current labeled node is a derivative node of a prior labeled node.

38. The system as defined in claim 29 wherein said service monitor unit receives a set of events from at least one user interface and controllably supplies said received events in a prescribed order to said service logic unit.

39. The system as defined in claim 38 wherein said service monitor unit supplies said events in said set of events one at a time in said prescribed order to said service logic unit.

40. The system as defined in claim 39 wherein said service logic in response to said supplied events controllably generates enabled events.

41. The system as defined in claim 40 wherein said enabled events are supplied to said service monitor unit and wherein said service monitor unit supplies said enabled events in a prescribed fashion to all appropriate ones of said user interfaces.

42. A method for providing an interactive user service comprising the steps of:

providing data and logic from a service logic unit to a plurality of user interfaces, wherein at least one of said user interfaces has natural language understanding;

facilitating effecting at least one or more of different functions from a set of functions including at least different ordering of inputs from any of said user interfaces, incomplete information from any of said user interfaces, correction of information from any of said user interfaces by enabling a user to change previously provided inputs, returning of control to prior points in said interactive service in response to a request from at least one of said user interfaces, without having to restart the interactive user service application, without having to restart the interactive user service application;

implementing reactive constraint graphs having a plurality of nodes, wherein each of said nodes contains a set of constraints on execution of events of said node;

evaluating whether enabled constraints in said set for a node have been satisfied.

43. The method as defined in claim 42 further including a step of controlling communication of inputs between said service logic unit and said user interfaces.

44. The method as defined in claim 43 wherein said communication is of events.

45. The method as defined in claim 44 wherein said step of providing further includes a step of providing natural language understanding interaction with at least one user through said at least one interface having natural language understanding.

46. The method as defined in claim 45 wherein said step of evaluating includes a step of passing control from a first node to a second node in accordance with prescribed criteria of said enabled constraints.

47. The method as defined in claim 46 wherein said second node is a derivative node from said first node.

48. The method as defined in claim 46 wherein said step of passing control from said first node to said second node includes a step of determining whether all of said enabled constraints in said set of constraints on said first node have been satisfied and a step of passing said control from said first node to said second node only when all of said enabled constraints have been satisfied.

49. The method as defined in claim 46 wherein said step of passing control from said first node to said second node includes a step of determining whether an enabled constraint has been violated and a step of passing control from said first node to said second node upon a determination that an enabled constraint has been violated.

50. The method as defined in claim 45 wherein said step of providing logic further includes a step of allowing a significant number of possible different ordering of inputs to said service logic unit by supporting a single set of constraints.

51. The method as defined in claim 45 wherein said step of providing logic further includes a step of evaluating enabled constraints in said set of constraints prior to all of said constraints being enabled, whereby use of incomplete information is supported.

52. The method as defined in claim 45 wherein said step of providing logic further includes a step of updating information in said constraint set upon receiving any new information, whereby correction of information is supported.

53. The method as defined in claim 45 wherein said step of providing logic includes a step of supporting labeling of said nodes, whereby control is allowed to revert back to prior labeled nodes in the process when a current labeled node is a derivative node of a prior labeled node.

54. The method as defined in claim 44 wherein said step of communicating includes steps of receiving a set of events from at least one user interface and controllably supplying said received events in a prescribed order to said service logic unit.

55. The method as defined in claim 54 wherein said step of supplying further includes a step of supplying said events in said set of events one at a time in said prescribed order to said service logic unit.

56. The method as defined in claim 55 wherein said step of providing further includes a step responsive to said supplied events for controllably generating enabled events.

57. The method as defined in claim 56 wherein said step of providing further includes a step of supplying said enabled events in a prescribed fashion to all appropriate ones of said user interfaces.

58. Apparatus for use in providing an interactive user service comprising:

means for providing data and logic to a plurality of user interfaces, wherein at least one of said user interfaces has natural language understanding; and wherein said mean for providing logic includes
service logic means for facilitating effecting at least one or more of different functions from a set of functions including at least different ordering of inputs from any of said user interfaces, incomplete information from any of said user interfaces, correction of information from said any of said interfaces by enabling a user to change previously provided inputs, returning of control to prior points in said interactive service in response to a request from at least one of said user interfaces, without having to restart the interactive user service application,
wherein said service logic means includes means for implementing reactive constraint graphs having a plurality of nodes, wherein each of said nodes contains a set of constraints on execution of events of said node,
wherein said service logic means includes service logic means for evaluating whether enabled constraints in said set for a node have been satisfied,
wherein said service logic means includes means for implementing reactive constraint graphs having a plurality of nodes, wherein each of said nodes contains a set of constraints on execution of events of said node, and
wherein said service logic means includes means for evaluating whether enabled constraints in said set of constraints for a node have been satisfied.

59. The invention as defined in claim 58 wherein said service logic means includes means for providing natural language understanding interaction with at least one user through said at least one interface having natural language understanding.

60. The invention as defined in claim 59 wherein said means for evaluating includes means for passing control from a first node to a second node in accordance with prescribed criteria of said enabled constraints.

61. The invention as defined in claim 60 wherein said second node is a derivative node from said first node.

62. The invention as defined in claim 60 wherein said means for passing control from said first node to said second node includes means for determining whether all of said enabled constraints in said set of constraints on said first node have been satisfied and means for passing said control from said first node to said second node only when all of said enabled constraints have been satisfied.

63. The invention as defined in claim 60 wherein said means for passing control from said first node to said second node includes means for determining whether an enabled constraint has been violated and means for passing control from said first node to said second node upon a determination that an enabled constraint has been violated.

64. The invention as defined in claim 59 wherein said service logic means further includes means for allowing a significant number of possible different ordering of inputs to said service logic unit by supporting a single set of constraints.

65. The invention as defined in claim 58 wherein said service logic means further includes means for evaluating enabled constraints in said set of constraints prior to all of said constraints being enabled, whereby use of incomplete information is supported.

66. The invention as defined in claim 59 wherein said service logic means further includes means for updating information in said constraints set upon receiving any new information, whereby correction of information is supported.

67. The invention as defined in claim 60 wherein said service logic means further includes means for supporting labeling of said nodes, whereby control is allowed to revert back to prior labeled nodes in the process when a current labeled node is a derivative node of a prior labeled node.

68. The invention as defined in claim 59 further including service monitor means for controlling communication of inputs between said service logic means and said plurality of user interfaces.

69. The invention as defined in claim 68 wherein said communication is of events.

70. The invention as defined in claim 69 wherein said service monitor means includes means for receiving a set of events from at least one user interface and means for controllably supplying said received events in a prescribed order to said service logic means.

71. The invention as defined in claim 70 wherein said means for supplying includes means for supplying said events in said set of events one at a time in said prescribed order to said service logic means.

72. The invention as defined in claim 71 wherein said means for providing further includes means responsive to said supplied events for controllably generating enabled events.

73. The invention as defined in claim 72 wherein said service monitor means further includes means for supplying said enabled events in a prescribed fashion to all appropriate ones of said user interfaces.

* * * * *